(12) United States Patent
Testa

(10) Patent No.: US 12,377,916 B2
(45) Date of Patent: Aug. 5, 2025

(54) FRONT FRAME ASSEMBLY WITH SUSPENSION ATTACHMENT STRUCTURE FOR A MOTOR VEHICLE

(71) Applicant: FERRARI S.P.A., Modena (IT)

(72) Inventor: Daniele Testa, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/172,536

(22) Filed: Feb. 22, 2023

(65) Prior Publication Data

US 2023/0264743 A1 Aug. 24, 2023

(30) Foreign Application Priority Data

Feb. 24, 2022 (IT) .................. 102022000003419

(51) Int. Cl.
*B62D 21/11* (2006.01)
(52) U.S. Cl.
CPC .................. *B62D 21/11* (2013.01)
(58) Field of Classification Search
CPC .......... B62D 21/11; B62D 3/12; B62D 21/15; B62D 21/152; B62D 25/08; B62D 25/088; B62D 27/023
See application file for complete search history.

(56) References Cited

U.S. PATENT DOCUMENTS

| | | | | |
|---|---|---|---|---|
| 2001/0033094 A1* | 10/2001 | Sano | ...... | B62D 21/15 296/203.02 |
| 2011/0062677 A1* | 3/2011 | Kudla | ...... | B62D 3/12 280/124.109 |
| 2016/0311461 A1* | 10/2016 | Hardesty | ...... | B62D 21/152 |

(Continued)

FOREIGN PATENT DOCUMENTS

| | | |
|---|---|---|
| DE | 2845548 A1 | 4/1980 |
| DE | 102010048341 A1 * | 4/2012 ........... B62D 21/11 |

(Continued)

OTHER PUBLICATIONS

Degenstein, Thomas; Front Axle Support for Vehicle, Has Steering Gear, Rack Housing and Toothed Rack, Where Rack Housing in Rigidly Connected With Front Axle Housing Support and Forms Carrier Component of Front Axle Support, Apr. 19, 2012, DE-102010048341-A1, EPO, machine translation (Year: 2012).*

Fischer, Marcus; Frame-type Axle Carrier for a Motor Vehicle, Dec. 13, 2018, DE-102006057665-B4, EPO, machine translation (Year: 2018).*

(Continued)

*Primary Examiner* — Jason D Shanske
*Assistant Examiner* — Scott Lawrence Strickler
(74) *Attorney, Agent, or Firm* — CANTOR COLBURN LLP

(57) ABSTRACT

A front frame assembly for a motor vehicle includes a suspension attachment structure comprising an attachment portion fixable to a bodywork cell defining a passenger compartment of the motor vehicle, one or more attachment elements fixed with respect to the suspension attachment structure and configured to permit a coupling of a suspension of the motor vehicle to the attachment portion, and a steering box comprising a steering tie rod for steering a wheel hub of the motor vehicle, a tubular casing extending along a first straight axis, and a transmission element coupled to the steering tie rod and to the tubular casing in an axially movable manner along the first axis inside the casing, wherein the tubular casing is rigidly fixed to the suspension attachment structure.

12 Claims, 2 Drawing Sheets

(56) References Cited

U.S. PATENT DOCUMENTS

| | | | | |
|---|---|---|---|---|
| 2017/0001666 A1* | 1/2017 | Lavilluniere | ............ | B62D 3/12 |
| 2017/0057546 A1* | 3/2017 | Dressel | ................ | B62D 21/152 |
| 2021/0024132 A1 | 1/2021 | Okamoto | | |
| 2023/0356781 A1* | 11/2023 | Sun | ........................... | B62D 3/12 |

FOREIGN PATENT DOCUMENTS

| | | | | |
|---|---|---|---|---|
| DE | 102006057665 B4 * | 12/2018 | ............ | B62D 21/11 |
| FR | 3013669 A1 | 5/2015 | | |
| WO | 9841422 A1 | 9/1998 | | |

OTHER PUBLICATIONS

Italian Search Report for Application No. 102022000003419; Filing Date—Feb. 24, 2022; Date of Mailing—Oct. 4, 2022, 7 pages.

Lotus Cars Ltd: "Lotus Service Notes Front Suspension", Mar. 1, 1998 (Mar. 1, 1998), XP055961083, Retrieved from the Internet: URL:https://cardiagn.com/lotus-elise-works-hop-manual-pdf/ [retrieved on Sep. 14, 2022] 11 pages.

* cited by examiner

FRONT FRAME ASSEMBLY WITH SUSPENSION ATTACHMENT STRUCTURE FOR A MOTOR VEHICLE

CROSS-REFERENCE TO RELATED APPLICATIONS

This patent application claims priority from Italian patent application no. 102022000003419 filed on Feb. 24, 2022, the entire disclosure of which is incorporated herein by reference.

TECHNICAL FIELD

The invention relates to a front frame assembly comprising a suspension attachment structure for a motor vehicle, in particular of the sports type.

PRIOR ART

As known, the front frame of a motor vehicle has both a function for bodywork elements, i.e. external support cladding plates, such as the bumper or bonnet, or various connection brackets, and a front crash absorption function, i.e. occurring along the forward direction of the motor vehicle.

In particular, for the absorption of a front crash, the frame specifically includes an absorption box, also known as a crash box, which includes a pair of side members which extend parallel to the forward direction.

Usually, the side members extend, in particular directly, starting from a suspension attachment structure, also known as a shock tower, including the attachments for the motor vehicle suspensions.

While the side members are compressively deformable to fulfill their function of absorbing front crashes, the suspension attachment structure is typically rigid in order to reduce the propagation of vibrations caused by suspension movement, as well as to act as a solid support base for the suspensions themselves.

In some cases, the suspension attachment structure includes two separate bodies obtained in one piece by die casting; the bodies extend in a projecting manner from a bodywork wall, in particular a firewall, parallel to the forward direction between the side members and the bodywork wall itself.

In these cases, the suspension attachment structure needs to be stiffened with respect to shear stresses, i.e. stresses transversal to the forward direction.

For this reason, the front frame is normally provided with one or more crosspieces orthogonal to the forward direction and arranged between the two bodies so as to create a rigid connection between the bodies themselves, i.e. in practical terms to act as a bridge between the bodies.

Although the crosspieces are satisfactory for increasing the stiffness of the suspension attachment structure with respect to shear stresses, the crosspieces themselves constitute a drawback in terms of increased overall dimensions and weight of the frame assembly.

In the light of the above, the need is felt to improve the known frame assemblies, in particular by limiting the weight and dimensions thereof, while maintaining an acceptable stiffness with respect to transversal stresses.

An object of the invention is to meet the above-mentioned requirement, preferably in a simple and reliable manner.

DESCRIPTION OF THE INVENTION

The object is achieved by a front frame assembly for a motor vehicle as defined in claim 1.

The dependent claims describe particular embodiments of the invention.

BRIEF DESCRIPTION OF THE DRAWINGS

An embodiment of the invention is described hereinafter for a better understanding of the same by way of non-limiting example and with reference to the accompanying drawings, wherein.

EMBODIMENTS OF THE INVENTION

Figure 1:
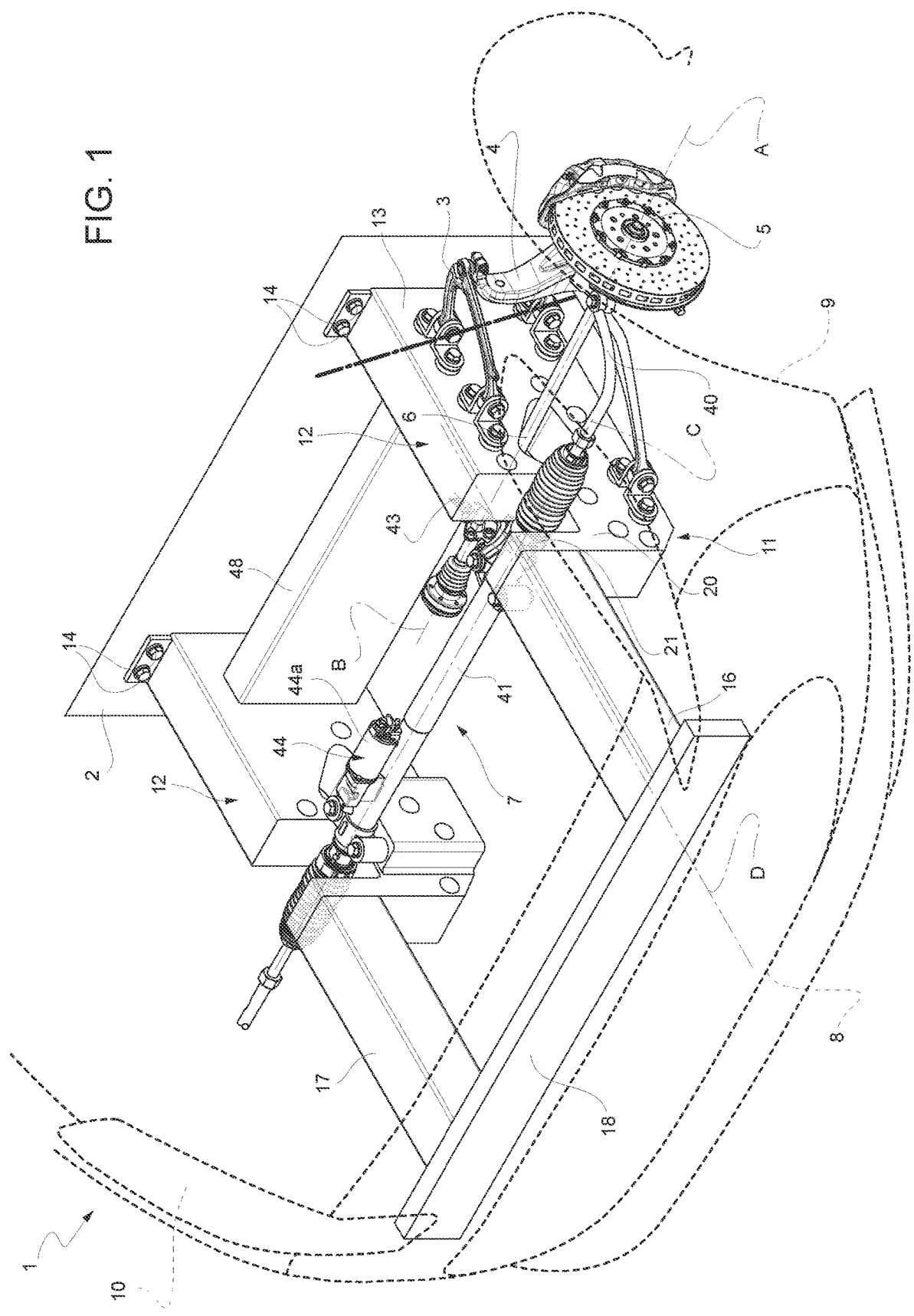
FIG. 1 is a schematic perspective view of a front portion of a motor vehicle comprising a frame assembly according to the invention.

In FIG. 1, the reference numeral 1 is used to indicate, as a whole, a motor vehicle.

Like all motor vehicles, the motor vehicle 1 has a normal forward direction and comprises a passenger compartment for accommodating at least one driver and possibly one or more passengers.

The motor vehicle 1 comprises a bodywork cell 2 which defines or surrounds the passenger compartment. For example, the bodywork cell 2 may be monolithic. Furthermore, the bodywork cell may comprise or be made of carbon fibre.

In particular, FIG. 1 schematically illustrates a firewall of the bodywork cell 2.

The motor vehicle 1 also comprises at least one, some or all of the typical components such as a suspension 3, a knuckle 4, a wheel hub 5, an axle shaft 6, and a steering gearbox or steering box 7.

The wheel hub 5 has a portion which is fixed with respect to the knuckle 4 and a portion which rotates about an axis A which is transversal with respect to the forward direction.

The fixed portion is carried by the knuckle 4, while the rotatable portion is coupled to the axle shaft 6 so that it may be driven in rotation by the latter.

The fixed portion is fixed with respect to the knuckle 4.

The axle shaft 6 extends along a straight axis B parallel to the axis A, but not necessarily coinciding with it.

The steering box 7 extends along a further straight axis C parallel to the axes A, B, or transversal and more precisely orthogonal to the forward direction.

The axis C is horizontal, i.e. it belongs to a plane orthogonal to the component of the force of gravity balanced by the ground.

The steering box 7 is a well-known device coupled to the wheel hub 5 with the function of steering the fixed portion of the wheel hub 5, in particular transforming a rotary movement of a steering wheel (not illustrated) of the motor vehicle 1 into a straight movement along the axis C useful for steering the fixed portion of the wheel hub 5.

In fact, the steering box 7 is more generally part of a steering apparatus of the motor vehicle 1, including for example also the steering wheel and configured to steer the fixed portion of the wheel hub 5.

The steering box 7 comprises a steering tie rod 40 coupled to the knuckle 4 or to the wheel hub 5 in known manner.

Furthermore, the steering box 7 comprises a steering transmission configured to transmit the rotation of the steering wheel to the steering tie rod 40, such that the steering tie rod 40 translates in response to the rotation of the steering wheel.

The steering transmission comprises a known and not illustrated transmission element, such as for example a rack or a worm screw, optionally with ball recirculation.

The transmission element is coupled to the steering tie rod 40; for example, the transmission element is fixed with respect to the steering tie rod 40, in particular fixed to the steering tie rod 40.

The steering box 7 comprises a tubular casing 41, which at least partially houses the transmission element and extends along the axis C.

The transmission element is coupled to the tubular casing 41 in an axially movable or translating manner along the axis C inside the casing 41.

Therefore, the steering tie rod 40 is configured so as to move in response to the translation of the transmission element, thus steering the wheel hub 5, in particular causing a rotation of the knuckle 4 about an axis directed from the bottom upwards.

The transmission element may be coupled to the steering wheel via a steering transmission kinematic chain, for example including a shaft 43 coupled to the steering wheel so as to rotate in response to a rotation of the steering wheel and terminating inside the casing 41 with a transmission member (not illustrated) configured to cooperate with the transmission element so as to transmit a rotation of the shaft 43 to the transmission element, which translates in response to this latter rotation.

For example, the transmission member may comprise a pinion meshing with the rack forming part of the transmission member.

Thus, the steering transmission may be a typical rack-and-pinion type mechanism, where the pinion coupled to the steering wheel meshes with the rack coupled to the tie rod; the rack translates along the axis C in response to the rotation of the pinion, which is in turn caused by the steering wheel via the kinematic chain.

Optionally, the steering box 7 may comprise an actuator device 44 for carrying out a power steering function.

The actuator device 44 is carried by the casing 41 and has, for example, a casing 44a thereof which is fixed with respect to the casing 41.

The actuator device 44 is configured to move the transmission element along the axis C, for example independently or in coordination with the rotation of the steering wheel.

The actuator device 44 may comprise an electric motor inside the casing 44a and a further transmission not illustrated for transmitting the power output from the electric motor to the transmission member.

The motor vehicle 1 also comprises a front frame assembly 11 having for example a support function for bodywork elements of the motor vehicle 1, i.e. external panels or sheets, such as for example a bumper 8, a mudguard 9, a bonnet 10, and similar.

The assembly 11 comprises a suspension attachment structure 12, alternatively referred to as shock tower.

More precisely, the assembly 11 comprises two suspension attachment structures or bodies 12 arranged at the lateral ends of the body cell 2, according to a horizontal direction and orthogonal to the forward direction.

The structures 12 extend parallel to each other along respective axes D parallel to the forward direction and in particular orthogonal to the firewall of FIG. 1.

The structures 12 extend in a projecting manner with respect to the bodywork cell 2. More precisely, the structures 12 protrude along the axes D from the bodywork cell 2, in particular directly from the bodywork cell 2.

The structures 12 are preferably equal to each other. For this reason, the following description will detail only one of the structures 12, it being understood that each feature described for one of the structures 12 is also applicable to the other of the structures 12. Therefore, the expression "the structure 12" may indifferently refer to any of the structures 12.

The structures 12 may also possibly be considered as a single structure 12.

The structure 12 has an attachment portion 13, which is fixed with respect to the bodywork cell 2, i.e. it is fixed to it, for example by means of releasable fastening devices 14, in particular comprising threaded members such as bolts.

Figure 2:
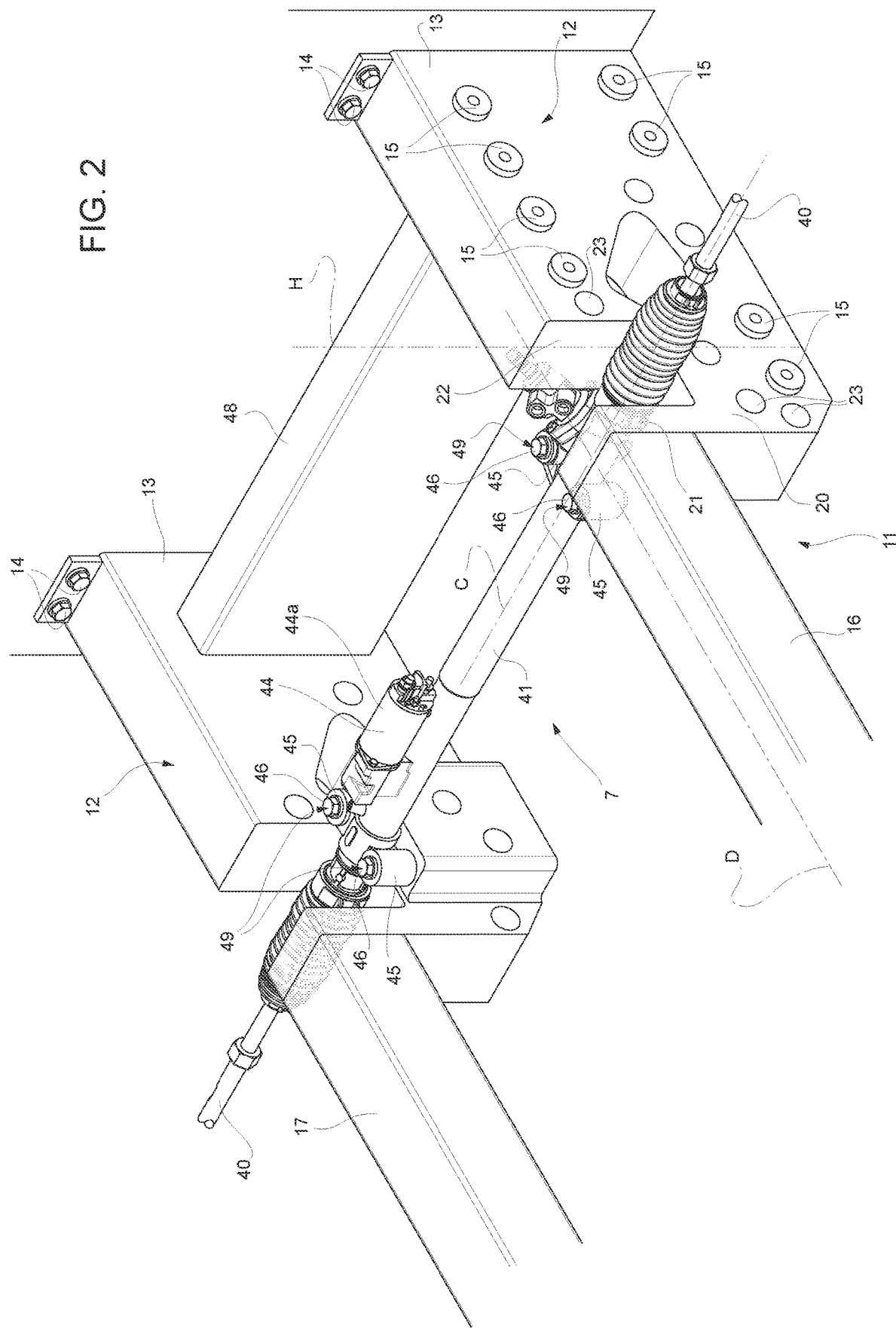
FIG. 2 is a schematic perspective view of a portion of the frame assembly.

The structure 12 has the function of supporting the suspension 3. In fact, the assembly 11 also comprises a plurality of attachment elements or attachments 15 (FIG. 2) configured to allow coupling of the suspension 3 to the attachment portion 13.

Some of the attachments 15 are located at the attachment portion 13, although this does not exclude that other attachments 15 may be located at other portions of the structure 12.

Furthermore, the attachments 15 may be part of the structure 12.

The structure 12 or better each of the structures 12 may preferably be a single piece, for example made using a casting technique or more precisely die casting.

The suspension 3 carries the knuckle 4 and is coupled to the attachment portion 13 through the attachments 15, in particular in a movable manner with respect to the structure 12. In turn, the knuckle 4 is movable with respect to the suspension 3.

Furthermore, the assembly 11 comprises the steering box 7 with the steering tie rod 40, the tubular casing 41 and the transmission element.

According to the invention, the tubular casing 41 is rigidly fixed to the structure 12.

The term rigidly fixed indicates that the tubular casing 41 is fixed with respect to the structure 12; in other words, the casing 41 may not have relative movements with respect to the structure 12 which go beyond negligible local deformations or vibrations of materials commonly recognized as rigid, such as metals. Again in other words, the tubular casing 41 is not suspended with respect to the structure 12 by means of elastic devices, such as springs or flexible bodies, possibly made of rubber.

Conveniently, the structure 12 comprises a plurality of threaded holes, whereby the assembly 11 comprises a plurality of threaded members 49, for example lag screws, coupled to the threaded holes and also to the casing 41 so as to rigidly fix the casing 41 to the structure 12.

More precisely, the threaded members 49 pass through respective sleeves 45 which are fixed with respect to the casing 41 and arranged coaxially at the threaded holes.

The sleeves 45 form part of the steering box 7 and each extend axially between two end faces, one of which is arranged around a corresponding one of the threaded holes, while the other faces in the opposite way.

In particular, the threaded members 49 have respective heads 46 which are tightened when the threaded members 49 are screwed to the threaded holes; the heads 46 are tightened respectively on the faces of the sleeves 45 facing oppositely to those arranged around the threaded holes.

In addition, optionally, the assembly 11 comprises at least one absorption element 16 for absorbing a front crash of the motor vehicle 1. The absorption element 16 comprises or rather is a side member, i.e. a beam, in particular box-shaped, extending parallel to the forward direction of the motor vehicle 1.

The element 16 is distinct from the structure 12 and is fixed with respect to it, i.e. fixed to it.

The element 16 extends along the axis D parallel to the forward direction of the motor vehicle 1.

The element 16 extends from the structure 12, i.e. it projects with respect to the structure 12, in particular towards the bumper 8. Specifically, the element 16 extends directly from the structure 12, i.e. it projects directly therefrom.

In fact, the assembly 11 also comprises another absorption element 17, preferably identical to the previous one and projecting parallel to the axis D from the other structure 12 not described in detail since it is analogous to the structure 12 described in detail.

Furthermore, the assembly 11 comprises a third absorption element 18 for absorbing a front crash of the motor vehicle 1. The absorption element 18 comprises or rather is a crosspiece, i.e. a beam, in particular box-shaped, extending transversely and more precisely orthogonally to the forward direction of the motor vehicle 1, in particular horizontally.

The element 18 has two ends 18a, 18b fixed to the elements 16, 17 respectively at corresponding opposite ends thereof with respect to the structure 12 or to the bodywork cell 2 along the axis D.

The elements 16, 17, 18 are individually part of an absorption box of the assembly 11; the absorption box is alternatively referred to as a crash box.

The structure 12 also comprises a collapsible portion 20 located between the element 16 and the attachment portion 13 according to the axis D.

More precisely, the collapsible portion 20 extends along an axis H orthogonal to the axis D and to the axis C, i.e. an axis directed from top to bottom, throughout the extension of the structure 12 along the same axis H. In other words, the collapsible portion 20 has an extension along the axis H equal to an extension of the structure 12 along the same direction.

Furthermore, in particular, the collapsible portion 20 is adjacent to the element 16 with respect to the axis D. In other words, the element 16 extends from the collapsible portion 20 in a cantilever manner, more particularly directly from the collapsible portion 20.

Some of the attachments 15 are optionally arranged at the collapsible portion 20.

Preferably, the structure 12 consists of the portions 13, 20, and possibly of the attachments 15 in addition.

The collapsible portion 20 is less rigid in compression than the attachment portion 13. In other words, the collapsible portion 20 has a compressive stiffness lower than that of the attachment portion 13.

Furthermore, the collapsible portion 20 has a compressive stiffness equal to or greater than that of the element 16, although this is not strictly necessary. In fact, according to alternative embodiments, the collapsible portion 20 may be less rigid in compression than the element 16.

In particular, the collapsible portion 20 has a compressive strength defined by a compressive breaking stress equal to any value in a range between 140 kN and 200 kN, more preferably between 160 kN and 180 kN.

Furthermore, in greater detail, the extension of the collapsible portion 20 along the axis D is less than half of the overall extension of the structure 12 along the axis D, i.e. the distance between the element 16 and the bodywork cell 2.

More precisely, the extension of the collapsible portion 20 along the axis D is less than three-fifths of the overall extension of the structure 12 along the axis D.

In particular, the collapsible portion 20 is such that a maximum deceleration of the motor vehicle 1 along the axis D is equal to any value in a range between 15 G and 25 G.

Preferably, the casing 41 is fixed at the collapsible portion 20 and extends transversely to the axis D, i.e. along the axis C. Here, the term "at" means that the actual fixing point of the casing 41 to the structure 12 belongs to the collapsible portion 20.

More specifically, the threaded holes are made on the collapsible portion 20.

In particular, according to the axis C, the threaded holes are formed inside the absorption elements 16, 17 or between the absorption elements 16, 17.

Advantageously, the casing 41 is the only beam or beam element fixed at the collapsible portion 20 and extending transversely to the axis D.

In other words, the assembly 11 has no beam elements or beams distinct from the casing 41, fixed at the collapsible portion 20 and extending transversely to the axis D.

Thus, there are no beams or crosspieces connecting the collapsible portions 20 of the structures 12 by extending parallel to the C axis or transversal to the axis D.

Similarly, there are no beams or crosspieces connecting the collapsible portion 20 of one of the structures 12 to the attachment portion 13 of the other of the structures 12.

In the illustrated embodiment, the assembly 11 comprises a beam or crosspiece 48 fixed to the structure 12 at the attachment portion 13.

The crosspiece 48 extends transversely to the axis D or parallel to the axis C. Furthermore, preferably, the crosspiece 48 is arranged between the structures 12 and more precisely, it connects them by being fixed to both structures 12 at their attachment portions 13.

Preferably, the collapsible portion 20 has a through hole along the axis C. The steering box 7 passes through the collapsible portion 20 through the through hole. That is, the steering box 7 passes through the through hole along the axis C. In particular, the steering tie rod 40 passes through the through hole along the axis C.

More precisely, the collapsible portion 20 has an end 21 along the axis H, in particular an upper end.

The end 21 has a recess 22 which includes or is defined by the hole passing along the axis C and extending in depth along the axis H.

The recess 22 houses the steering box 7 or more precisely the steering tie rod 40. In other words, the steering box 7 or more precisely the steering tie rod 40 crosses the structure 12 through the recess 22, i.e. it crosses or extends through the recess 22 along the axis C.

The casing 41 extends in particular from the opposite side of the suspension attachments 15 with respect to the structure 12.

In other words, the casing 41 extends between the structures 12.

The steering tie rod 40 projects with respect to the casing 41 or comes out of the casing 41 according to the axis C.

Preferably, the recess 22 is open along the axis H, in particular upwards. In other words, the recess 22 has an inlet opening, i.e. an upper end, extending transversely to the axis H.

The recess 22 has a U or concave shape with respect to the axis H, in particular towards the top.

According to the axis C, the recess 22 extends for the entire extension or width of the collapsible portion 20 along the axis C, i.e. at the recess 22 itself.

Preferably, the recess 22 has a depth along the axis H greater than at least one third of the overall extension of the collapsible portion 20 along the axis H.

Furthermore, conveniently, the recess 22 has an extension parallel to the axis D greater than at least one third or more preferably at least half of the overall extension of the collapsible portion 20 along the axis D.

Alternatively, a ratio between the maximum extension of the recess 22 parallel to the axis D and the overall extension of the structure 12 along the axis D is equal to any value between 1/15 and 1/3.

Therefore, due to and at the recess 22, the collapsible portion 20 has a section transversal with respect to the axis D which is weakened with respect to any transversal section of the attachment portion 13 with respect to the same axis D.

Therefore, in this sense, the collapsible portion 20 is generally weakened with respect to the attachment portion 13. This is the reason for the lower compressive stiffness of the collapsible portion 20 with respect to the attachment portion 13.

Conveniently, the collapsible portion 20 may be further weakened, for example because the collapsible portion 20 comprises one or more holes 23 extending transversely to both axes D, H, for example parallel to axis C. In other words, the holes 23 extend along respective directions transversal to both the axes D, H or parallel to the axis C.

Optionally, the holes 23 are substantially aligned with the recess 22 according to the axis H. Here, the term substantially indicates that at least one axis parallel to the axis H extends inside the recess 22 and simultaneously intersects or is tangent to one of holes 23.

Each of the holes 23 may optionally be a through hole of the collapsible portion 20.

Preferably, the recess 22 is aligned with the first axis D. That is, the axis D extends inside the recess 22. For clarity, it should be recalled here that axis D is the axis of the beam or side member defining the element 16.

Preferably, the threaded holes for fastening the casing 41 have respective axes parallel to the axis H.

From the foregoing, the advantages of the assembly 11 according to the invention are apparent.

In fact, the lower compressive stiffness of the collapsible portion 20 with respect to the attachment portion 13 adds to the structure 12, which is typically rigid according to the prior art, properties of deformability and therefore of absorption of front crashes.

In this way, the collapsible portion 20 may cooperate with the element 16 in absorbing front crashes, so that the element 16 does not require elongations along the axis D.

In this context, however, the collapsible portion 20 needs even more stiffening with respect to transversal stresses with respect to the axis D.

This stiffening is advantageously provided by the casing 41 of the steering box 7; in fact, the casing 41 defines a beam element or a beam or a crosspiece, which substantially adds rigid material to the structure 12 by being rigidly connected thereto, thus increasing the stiffening thereof.

In particular, the stiffening takes place advantageously at the collapsible portion 20, which is weakened with respect to the attachment portion 13.

Therefore, the fixing of the casing 41 to the collapsible portion 20 in a rigid manner responds to a design requirement, according to which crosspiece or beam extending parallel to the axis C at the collapsible portion 20 is suitable for avoiding flapping of the frame assembly 11.

The casing 41 is part of the steering box 7, so it is in any case an element already normally included in the motor vehicle 1. Therefore, the overall weight and overall dimensions are not increased.

Therefore, the casing 41 performs a double function of structural stiffening element and of housing the transmission element.

Additional beams parallel to the axis C or transversal to the axis D are not necessary and therefore are absent, so that the weight and bulk of the assembly 11 remains contained.

Finally, it is clear that changes and variations may be made to the assembly 11 according to the invention which however do not depart from the scope of protection defined by the claims.

In particular, the number and shape of the components described and illustrated may be different and in particular varied with great freedom.

Furthermore, each range described is to be interpreted as a plurality of single alternative values. Each single numerical value within the range must be considered as specifically described even if not explicitly mentioned.

Finally, the term collapsible is to be understood in a relative way with respect to the attachment portion 13, in particular with the meaning of more collapsible than the attachment portion 13, it being understood that a preferred material for the collapsible portion 20 is a ductile material, such as for example aluminum or steel.

The invention claimed is:

1. A front frame assembly (11) for a motor vehicle (1), the front frame assembly (11) comprising
   a suspension attachment structure (12) comprising an attachment portion (13) fixable to a bodywork cell (2) defining a passenger compartment of the motor vehicle (1),
   one or more attachment elements (15) fixed relative to the suspension attachment structure (12) and configured to permit a coupling of a suspension (3) of the motor vehicle (1) to the attachment portion (13),
   a steering box (7) comprising a steering tie rod (40) for steering a wheel hub (5) of the motor vehicle (1), a tubular casing (41) extending along a first straight axis (C) and a transmission element coupled to the steering tie rod (40) and to the tubular casing so as to be axially movable along the first axis (C) inside the tubular casing (41), and
   an absorption element (16) for absorbing a front crash of the motor vehicle (1), the absorption element (16) being distinct from the suspension attachment structure (12), being fixed relative to the suspension attachment structure (12) and extending in a cantilever manner from the suspension attachment structure (12) along a second straight axis (D) transversal to the first axis (C),
   wherein the suspension attachment structure (12) further comprises a collapsible portion (20) located between the absorption element (16) and the attachment portion (13) according to the second straight axis (D), the collapsible portion (20) having a first compression stiffness that is equal to or greater than a second compression stiffness of the absorption element (16) and smaller than a third compression stiffness of the attachment portion (13), and
   wherein the tubular casing (41) is fixed to the suspension attachment structure (12) at the collapsible portion (20) and extends transversely relative to the second axis (D), wherein the collapsible portion (20) has a through hole (22) along the first axis (C), whereby the steering box (7) goes through the collapsible portion (20) through the through hole (22).

2. The assembly according to claim 1, wherein the suspension attachment structure (12) comprises a plurality of threaded holes, whereby the assembly comprises a plurality of threaded members (44) respectively coupled to the threaded holes and also to the tubular casing (41) so as to rigidly fix the tubular casing (41) to the suspension attachment structure (12).

3. The assembly according to claim 1, wherein the tubular casing (41) is the only beam element fixed at the collapsible portion (20) and extending transversely to the second axis (D).

4. The assembly according to claim 1, wherein the collapsible portion (20) has an extension along a third axis (H), the third axis (H) being orthogonal to the first axis (C) and to the second axis (D), equal to an extension of the suspension attachment structure (20) along the third axis (H).

5. The assembly according to claim 1, wherein the collapsible portion (20) has an end (21) according to a third axis (H) orthogonal to the first axis (C) and to the second axis (D), the end (21) having a recess (22) extending in depth along the second axis (H) and comprising the through hole (22).

6. The assembly according to claim 5, wherein the recess (22) is aligned with the second axis (D).

7. The assembly according to claim 5, comprising one or more holes (23) extending along respective directions transversal to both the second and the third axis (D, H) as well as substantially aligned with the recess (22) according to the third axis (H).

8. The assembly according to claim 1, wherein the collapsible portion (20) extends along the second axis (D) over less than half an overall extension of the suspension attachment structure (20) along the second axis (D).

9. The assembly according to claim 1, wherein the suspension attachment structure (12) is a single piece manufactured by means of die casting.

10. A motor vehicle (1) comprising
a passenger compartment,
a bodywork cell (2) defining the passenger compartment,
a suspension (3), and
a front frame assembly (11) according to claim 1,
wherein the attachment portion (13) of the front frame assembly (11) is fixed to the body cell (2), and wherein the suspension (3) is coupled to the attachment elements (15), and the second axis (D) being parallel to the forward moving direction of the motor vehicle (1).

11. A front frame assembly for a motor vehicle (1), the front frame assembly (11) comprising:
two suspension attachment structures (12) arranged at lateral ends of a bodywork cell and extending in a forward direction of the motor vehicle, each suspension attachment structure (12) defined by a single structure comprising an attachment portion (13) fixable to the bodywork cell (2) defining a passenger compartment of the motor vehicle (1) and a collapsible portion (20),
one or more attachment elements (15) fixed relative to each one of the two suspension attachment structures (12) and configured to permit a coupling of a suspension (3) of the motor vehicle (1) to the attachment portion (13), and
a steering box (7) comprising a steering tie rod (40) for steering a wheel hub (5) of the motor vehicle (1), a tubular casing (41) extending along a first straight axis (C) and a transmission element coupled to the steering tie rod (40) and to the tubular casing so as to be axially movable along the first axis (C) inside the tubular casing (41), wherein the tubular casing (41) is rigidly fixed to each of the suspension attachment structures (12), and
two absorption elements (16) for absorbing a front crash of the motor vehicle (1), the two absorption elements (16) being distinct from each of the two suspension attachment structures (12), each of the two absorption elements (16) being fixed relative to respective ones of the two suspension attachment structures (12) and extending in a cantilever manner from the respective suspension attachment structure (12) along a second straight axis (D) transversal to the first axis (C),
wherein the collapsible portions (20) are located between a respective one of the absorption elements (16) and the attachment portions (13) according to the second straight axis (D), each of the collapsible portions (20) having a first compression stiffness that is equal to or greater than a second compression stiffness of the respective absorption element (16) and smaller than a third compression stiffness of the respective attachment portion (13),
wherein the tubular casing (41) is fixed to each of the suspension attachment structures (12) at the respective collapsible portion (20) and extends transversely relative to the second axis (D),
wherein each of the collapsible portions (20) have a through hole (22) along the first axis (C), whereby the steering box (7) goes through the collapsible portions (20) through the respective through hole (22), and
wherein each of the collapsible portions (20) have an extension along a third axis (H), the third axis (H) being orthogonal to the first axis (C) and to the second axis (D), equal to an extension of the two suspension attachment structures (20) along the third axis (H).

12. A front frame assembly for a motor vehicle (1), the front frame assembly (11) comprising:
two suspension attachment structures (12) arranged at lateral ends of a bodywork cell and extending in a forward direction of the motor vehicle, each suspension attachment structure (12) defined by a single structure comprising an attachment portion (13) fixable to the bodywork cell (2) defining a passenger compartment of the motor vehicle (1) and a collapsible portion (20),
one or more attachment elements (15) fixed relative to each one of the two suspension attachment structures (12) and configured to permit a coupling of a suspension (3) of the motor vehicle (1) to the attachment portion (13),
a steering box (7) comprising a steering tie rod (40) for steering a wheel hub (5) of the motor vehicle (1), a tubular casing (41) extending along a first straight axis (C) and a transmission element coupled to the steering tie rod (40) and to the tubular casing so as to be axially movable along the first axis (C) inside the tubular casing (41), wherein the tubular casing (41) is rigidly fixed to each of the suspension attachment structures (12); and
absorption elements (16) for absorbing a front crash of the motor vehicle (1), the absorption elements (16) being distinct from the two suspension attachment structures (12), each absorption element being fixed relative to each of the suspension attachment structures (12) and extending in a cantilever manner from the two suspension attachment structures (12) along a second straight axis (D) transversal to the first axis (C), wherein the collapsible portions (20) are located between the respective absorption elements (16) and the attachment portions (13) according to the second straight axis (D), the collapsible portions (20) having a first compression stiffness that is equal to or greater than a second compression stiffness of the respective absorption element (16) and smaller than a third compression stiffness of the respective attachment portion (13), wherein the tubular casing (41) is fixed to each of the suspension attachment structures (12) at the respective collapsible portion (20) and extends transversely relative to the second axis (D), wherein each of the collapsible portions (20) have a recessed end along the first axis (C) at an upper end, whereby the steering box (7) crosses the suspension attachment structures (12) through the respective recesses along the first axis (C).

\* \* \* \* \*